United States Patent [19]
Schellinger et al.

[11] Patent Number: 6,052,592
[45] Date of Patent: Apr. 18, 2000

[54] CALL ROUTING SYSTEM FOR A WIRELESS DATA DEVICE

[75] Inventors: Michael J. Schellinger, Vernon Hills; Robert F. D'Avello, Lake Zurich, both of Ill.

[73] Assignee: Motorola, Inc., Schaumburg, Ill.

[21] Appl. No.: 08/790,007

[22] Filed: Jan. 28, 1997

Related U.S. Application Data

[63] Continuation of application No. 08/243,040, May 6, 1994, abandoned.

[51] Int. Cl.[7] ..................................................... H04Q 7/38
[52] U.S. Cl. ........................... 455/445; 455/426; 455/560; 455/462
[58] Field of Search .................................... 455/417, 422, 455/426, 445, 461, 462, 465, 550, 552, 567, 560–561; 379/127, 142

[56] References Cited

U.S. PATENT DOCUMENTS

| | | | |
|---|---|---|---|
| 4,644,351 | 2/1987 | Zabarsky et al. | 379/57 |
| 4,876,738 | 10/1989 | Selby | 455/435 |
| 4,953,198 | 8/1990 | Daly et al. | 379/61 |
| 4,980,907 | 12/1990 | Raith et al. | 379/58 X |
| 5,265,150 | 11/1993 | Helmkamp et al. | 379/58 |
| 5,274,699 | 12/1993 | Ranz | 379/142 |
| 5,315,637 | 5/1994 | Breeden et al. | 379/62 |
| 5,353,331 | 10/1994 | Emery et al. | 379/58 |
| 5,363,429 | 11/1994 | Fujisawa | 379/61 |
| 5,398,279 | 3/1995 | Frain | 379/142 X |
| 5,422,930 | 6/1995 | McDonald et al. | 379/58 |
| 5,428,668 | 6/1995 | Dent et al. | 379/58 X |
| 5,442,680 | 8/1995 | Schellinger et al. | 379/58 |
| 5,805,992 | 9/1998 | Schellinger | 455/411 |

FOREIGN PATENT DOCUMENTS

| | | |
|---|---|---|
| 60-77539 | 5/1985 | Japan . |
| 63-125025 | 5/1988 | Japan . |
| 1-143457 | 6/1989 | Japan ..................................... 379/142 |

OTHER PUBLICATIONS

*The GSM System for Mobile Communications*, Michel Mouly et al. pp. 444–455, 1992.
"Teledigital's Wireless Management Environment" Sales Brochure, pp. 1–3, Summer 1994.

*Primary Examiner*—Dwayne D. Bost
*Assistant Examiner*—William G. Trost
*Attorney, Agent, or Firm*—Lalita P. Williams; Donald C. Kordich

[57] ABSTRACT

A call routing system includes an authorization and call routing equipment (ACRE) 117, a cordless base station 115 connected by a wireline network 111 having caller identification. The cordless base station 115 initiates a call to the ACRE 117, which receives the cordless base station's 115 telephone number. The ACRE 117 then uses the telephone number for routing subsequent telephone calls to the cordless base station 115. The cordless base station 115 can receive and store caller indentification information and transmit this information to a radiotelephone 101.

2 Claims, 7 Drawing Sheets

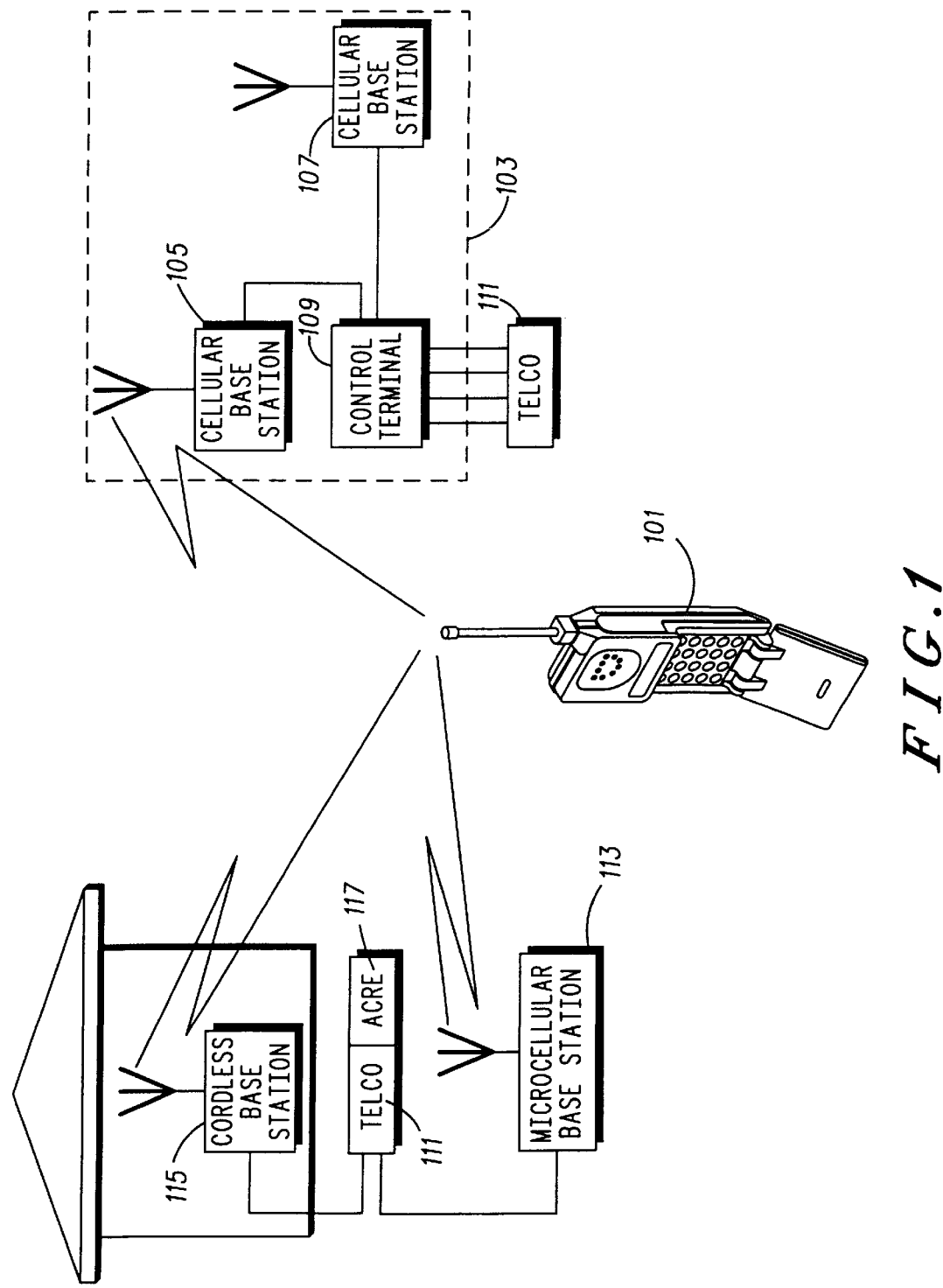

GENERIC CALLER ID WORD FORMAT

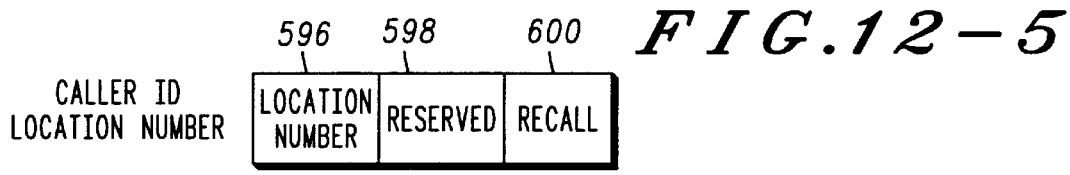

CALL ROUTING SYSTEM FOR A WIRELESS DATA DEVICE

This is a continuation of application Ser. No. 08/243,040, filed May 6, 1994 and now abandoned.

FIELD OF THE INVENTION

The present invention relates generally to portable telephones, and more particularly to an improved portable telephone that operates in both cordless and cellular telephone systems.

BACKGROUND OF THE INVENTION

A cordless telephone system typically includes a portable cordless handset and a cordless base station connected to a telephone company phone system (TELCO) by telephone landlines. The cordless base station has an assigned landline telephone number that allows the user to place and receive calls using the cordless portable handset within a limited range of the cordless base station, such as in a home. However, due to their limited range, the cordless portable handset provides the user with relatively local radiotelephone communication.

Radiotelephone communication outside the range of the cordless telephone system may also be provided to the user via a cellular telephone system. A cellular telephone system typically includes cellular subscriber units (mobile or portable) and cellular base stations connected to the TELCO via one or more cellular switching networks. Each cellular subscriber unit has an assigned cellular telephone number that allows the user to place and receive calls within a widespread range of the cellular base stations, such as throughout a metropolitan area. However, the cost of using the cellular telephone service is much greater than the cordless telephone service.

A problem exists for the user that frequently relocates between the cordless and cellular telephone systems. An incoming call routed to the system where the user is not located may be missed. In the prior art, landline and cellular telephone companies have provided a solution to this problem with features known as No Answer Transfer or Call Forwarding or Three Way Calling. No Answer Transfer enables the user to program the system to route an incoming call from the cellular telephone system to the cordless telephone system or visa versa when the user's telephone that was called is not turned on, not answered, or out of range of the base station. Thus, the user may receive an incoming call placed to either the cordless or cellular telephone system.

Some problems exist with the No Answer Transfer feature. The user must manually program the system each time there is a need to activate or deactivate the No Answer Transfer feature. Manually programming the system is a cumbersome task for the user and forgetfulness of the user may result in missed or improperly routed incoming calls. The user must also purchase and operate unique radiotelephone equipment for both the cordless and cellular telephone systems resulting in increased cost and inconvenience to the user.

Accordingly, there is a need for a radiotelephone system that enables a user to receive incoming calls via both a cordless and cellular telephone system without the imposing inconvenience and expense on the user.

DETAILED DESCRIPTION OF A PREFERRED EMBODIMENT

Figures 1, 12:
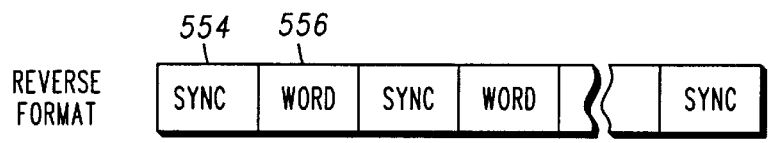
FIG. 1 is a block diagram of an operating configuration for a portable radiotelephone in which several systems, including both a cellular system and a cordless system, may be accessed by the same portable radiotelephone.
FIG. 12 shows the signal protocol for signals transmitted between the radiotelephone of FIG. 5 and the cordless base station of FIG. 4.
Figures 2, 12:
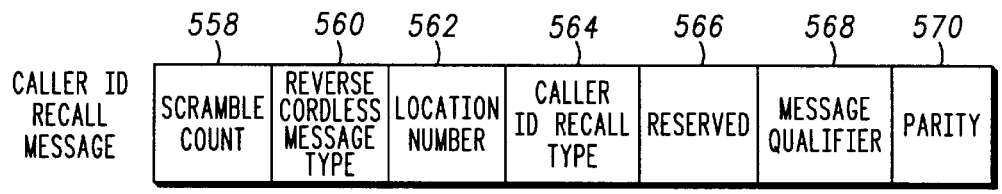
Figures 3, 12:
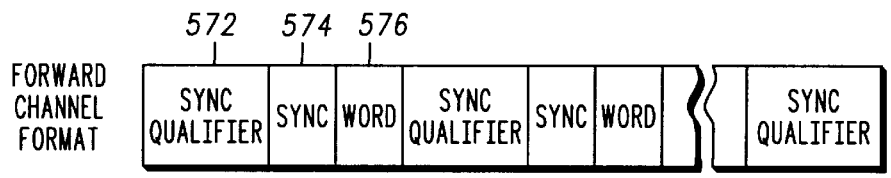
Figures 4, 12:
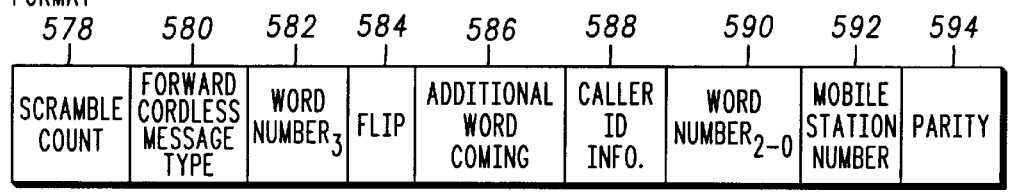

A generalized block diagram of an application of the present invention is shown in FIG. 1. A portable cellular cordless (PCC) radiotelephone device 101 is shown having the ability to communicate with a conventional cellular radiotelephone system 103, which has a plurality of cellular base stations 105, 107 located at geographically separate locations but arranged to provide radiotelephone coverage over a wide geographic area. The cellular base stations are coupled to a control terminal 109 which provides coordination among the plurality of cellular base stations, including handoff of user cellular mobile and portable equipment, and provides call switching and interconnect to the public switched telephone network (identified hereinafter as "TELCO") 111.

The PCC 101 further has the capacity to communicate with a microcellular base station 113, which is a cellular adjunct cell having lower power and limited capabilities but providing radiotelephone service to distinct areas such as shopping malls, airports, etc. The microcellular base station 113 is coupled to the TELCO 111 landline telephone system so that calls can be placed to the TELCO.

The PCC 101 further has the capability to communicate with and place radiotelephone calls via a cordless base station 115, which provides private telephone line interconnection to the TELCO 111 for the user of the PCC 101. The cordless communication system uses an authorization and call routing equipment (ACRE) 117 to provide call routing information to a telephone switching system. Thus, the switching system automatically routes phone calls between the cellular, microcellular and cordless systems. The ACRE 117 also authorizes the cordless base station 115 to utilize channels. The ACRE 117 can be part of the TELCO 111 or can be a stand alone device. As previously noted, the cordless base station 115 and the PCC 101 together provide the limited range radio service conventionally known as cordless telephone service. Such service has become pervasive, conventionally using a few radio frequency channels in the VHF (very high frequency) or UHF (ultra high frequency) radio bands.

The user of a radiotelephone should expect that radiotelephone service be available wherever he travels in the United States and that this service is provided at the lowest cost. It is also to be expected that radiotelephone service be provided in a portable unit that is as compact and inexpensive as possible. The PCC 101 is uniquely configured to meet this end. Furthermore, the cordless base station 115 is uniquely designed to provide telephone interconnect to the user's home telephone line when the user has the PCC 101 within the radio range of the cordless base station 115.

Figure 2:
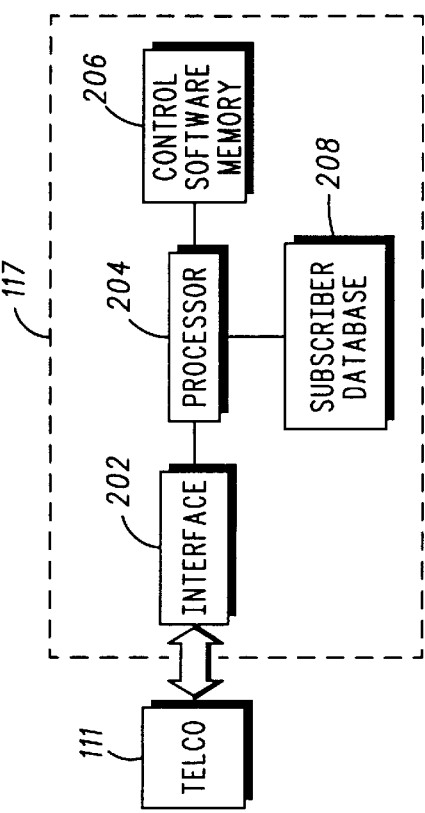
FIG. 2 is a block diagram of an authorization and call routing equipment (ACRE).

A block diagram of the ACRE 117 is shown in FIG. 2. The ACRE 117 is connected to a TELCO 111 by an interface 202. The interface 202 controls and formats messages between the TELCO 111 and a processor 204. The processor 204 in combination with a control software memory 206 is the intelligence of the ACRE 117 and performs authorization, and authentication tasks and provides call routing information. A subscriber database 208 contains the data required by the processor 204 in order to perform the tasks discussed above. The ACRE 117 can be separate from the TELCO 111 as shown in FIG. 2 or can be part of the TELCO 111, usually part of the switching equipment. When the ACRE 117 is part of the TELCO 111 the ACRE 117 may not need the interface 202. Additionally, the functions of the ACRE may be performed by existing equipment at the TELCO.

Figure 3:
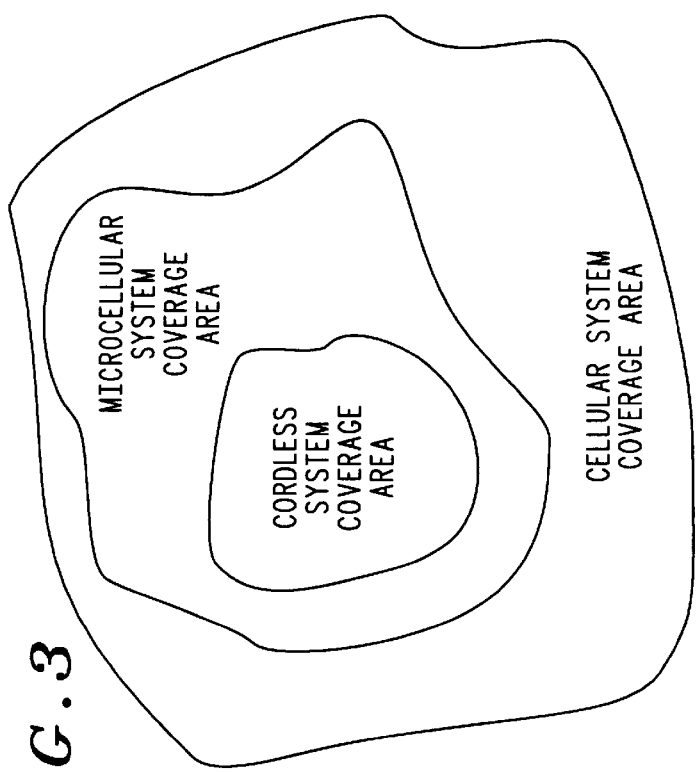
FIG. 3 is a diagrammatical map which shows a typical arrangement of coverage areas for the cordless, microcellular and cellular systems.

FIG. 3 shows a typical arrangement of coverage areas for the cordless, microcellular and cellular systems. The cordless system coverage area is the smallest and resides within the microcellular system. The microcellular system has intermediate coverage and resides within the cellular system. The coverage area of each system may depend upon but is not limited to the number of base stations in each system, antenna height of each base station and the power level used by each system. The user of the portable radiotelephone may relocate between the various coverage areas. The portable radiotelephone may change between systems based on but not limited to portable radiotelephone location, system availability, and user preference.

The coverage areas of the systems are not limited to the particular arrangement as shown in FIG. 3. A coverage area may be independent of another coverage area or may partially overlap one or more other coverage areas.

The cordless base station 115, conceptually, is a subminiature cellular system providing a single signaling channel which transmits outbound data messages in a fashion analogous to a conventional cellular outbound signaling channel, and receives service requests from a remote unit, such as a PCC 101. Proper service requests are granted with an assignment of a voice channel (made via the control channel) on the same or a second radio frequency to which the PCC 101 is instructed to tune for its telephone call.

Figure 4:
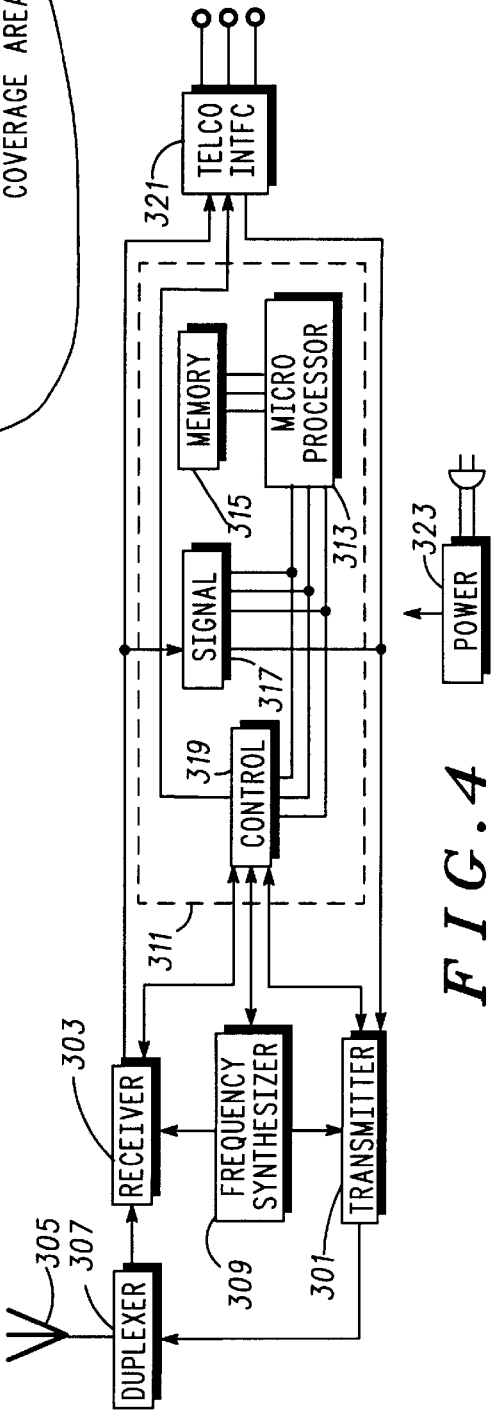
FIG. 4 is a block diagram of a cordless base station which may employ the present invention.

The basic implementation of a cordless base station is shown in FIG. 4. A conventional transmitter 301 and a conventional receiver 303 suitable for use in the 869 to 894 MHz and 824 to 849 MHz band of frequencies, respectively, being used for conventional cellular services, are coupled to a common antenna 305 via a duplexer 307. The power output of the transmitter 301 is limited to approximately 6 milliwatts so that interference to other services and other cordless telephone stations is minimized. The channel frequency selection is implemented by a frequency synthesizer 309 controlled by a logic unit 311. Within the logic unit 311 is a microprocessor 313, such as a 68HC11 available from Motorola, Inc., or similar microprocessor, which is coupled to conventional memory devices 315 which store the microprocessor operating program, base identification (BID) and customizing personality, and other features. Received and transmitted data is encoded/decoded and coupled between the receiver 303, the transmitter 301, and the microprocessor 313 by signaling interface hardware 317. The microprocessor instructions are conveyed and implemented by control hardware 319. Interface with the user's home landline telephone line is conventionally accomplished via a TELCO interface 321. Power is supplied from the conventional AC mains and backed-up with a battery reserve (all depicted as power 323).

Figure 5:
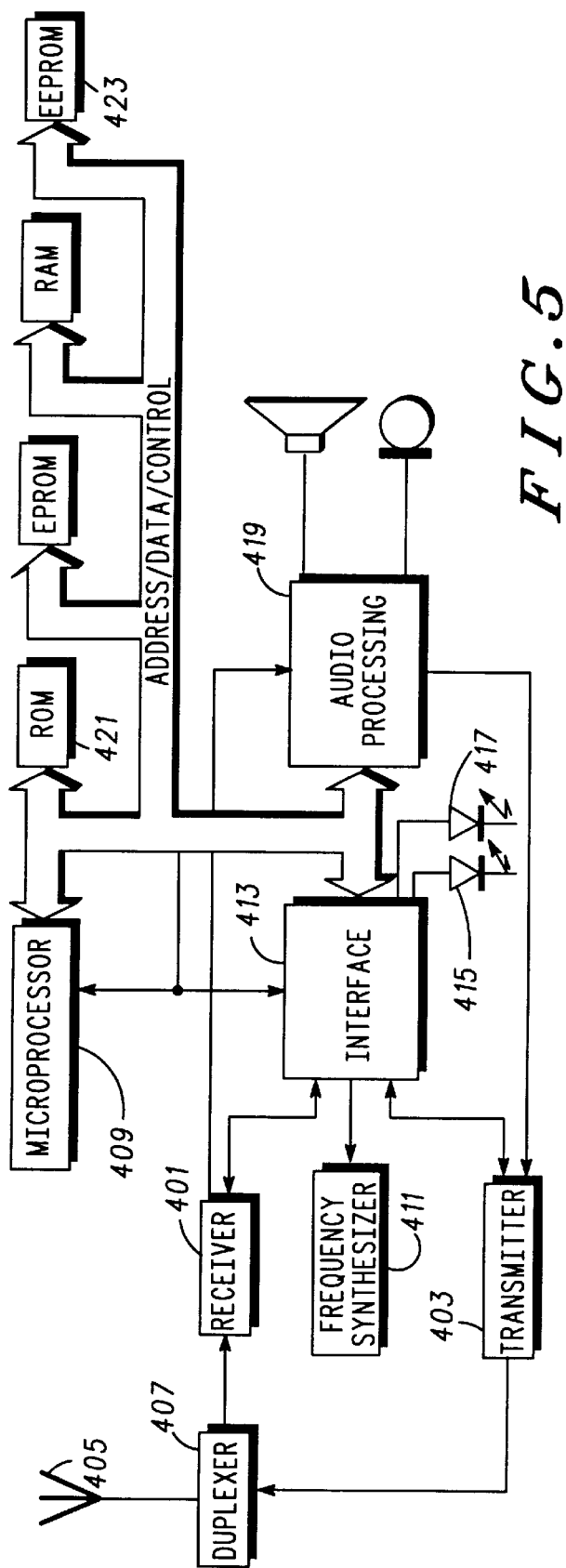
FIG. 5 is a block diagram of a portable radiotelephone which may employ the present invention.

The PCC 101 is a portable radiotelephone transceiver which is shown in block diagram form in FIG. 5. A portable radio receiver 401, capable of receiving the band of frequencies between 869 and 894 MHz, and a portable transmitter 403, capable of transmitting with low power (approximately 6 milliwatts in the preferred embodiment) on frequencies between 824 and 849 MHz, are coupled to the antenna 405 of the PCC 101 by way of a duplexer 407. The particular channel of radio frequency to be used by the transmitter 403 and the receiver 401 is determined by the microprocessor 409 and conveyed to the frequency synthesizer 411 via the interface circuit 413. Data signals received by the receiver 401 are decoded and coupled to the microprocessor 409 by the interface circuit 413 and data signals to be transmitted by the transmitter 403 are generated by the microprocessor 409 and formatted by the interface 413 before being transmitted by the transmitter 403. Operational status of the transmitter 403 and the receiver 401 is enabled or disabled by the interface 413. The interface also controls light emitting diodes, 415 and 417, which are used to indicate to the user which system the PCC 101 is currently receiving. Control of user audio, the microphone output and the speaker input, is controlled by audio processing circuitry 419.

In the preferred embodiment, the microprocessor 409 is a 68HC11 microprocessor, available from Motorola, Inc., and performs the necessary processing functions under control of programs stored in conventional ROM 421. Characterizing features of the PCC 101 are stored in EEPROM 423 (which may also be stored in the microprocessor, on-board EEPROM) and include the number assignment (NAM) required for operation in a conventional cellular system and the base identification (BID) required for operation with the user's own cordless base.

The transmitter 403 of the PCC 101 has the capability of transmitting with the full range of output power which is required for operation in a conventional cellular system. This range of output power consists of six sets of output power magnitude ranging from a high output power level of approximately 600 milliwatts to a low output power level of 6 milliwatts. This six set range of output power is enabled when the PCC 101 is in the cellular system mode.

According to the preferred embodiment of the present invention, the same PCC 101 is compatible with both the cordless and cellular telephone system 103. This is accomplished by enabling the PCC 101 to operate in both a cordless and cellular telephone system 103 using only cellular telephone frequencies.

The radiotelephone arrangement has desirable advantages for the user. The PCC 101, in combination with the cordless base station 115, can automatically route, via the ACRE 117, an incoming call to the telephone system in which the PCC 101 is located without inconveniencing the user. The TELCO 111, in combination with the ACRE 117, can automatically route an incoming call to the PCC 101 without inconvenience to the user.

Figure 6:
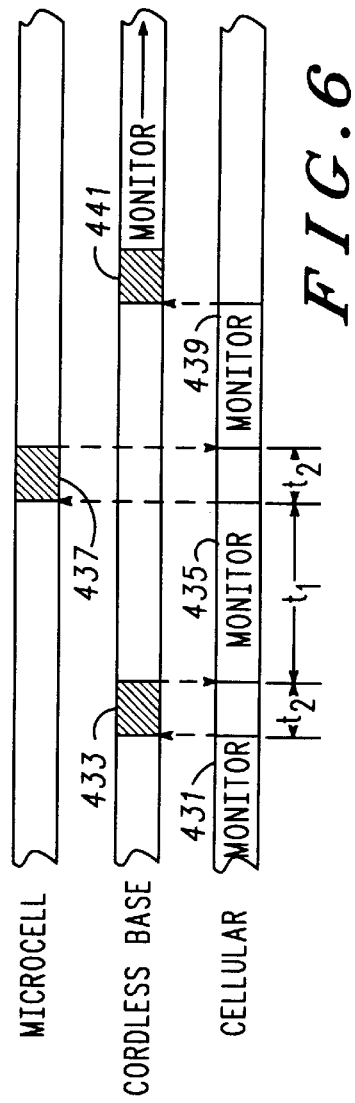
FIG. 6 is a timing diagram of the system scanning process which may be employed in the portable radiotelephone of FIG. 5.

The priority established for the PCC 101 is that the cordless base station 115 is the first desired path for a user's telephone call and the conventional cellular (or the microcell system) is the second choice, the process of implementing that priority is shown in FIG. 6. The depiction in FIG. 6 is of the PCC receiver's 401 reception of the outbound signaling channel or set of signaling channels transmitted from the cellular system, the cordless base, and the microcellular system relative to time. This diagram aids in the understanding of the unique scanning priority feature of the present invention.

The PCC receiver 401 can be monitoring 431 the outbound message stream being transmitted from the cellular system signaling channel (which was selected from among the plurality of cellular signaling channels in conventional fashion). At the appropriate time, the PCC receiver 401 is instructed by its microprocessor 409 to tune to the frequency or one of the frequencies being used by the cordless base station 115 as a signaling channel. The PCC receiver 401 scans 433 the cordless base outbound signaling channel or channels for a period of time $t_2$. If the signaling data stream is not received with sufficient quality, the PCC receiver 401 is returned to the previously selected signaling channel of the cellular system 103. It remains tuned to this signaling channel 435 for a period of time, $t_1$, before attempting another scan of a signaling channel of one of the alternative systems. The relationship of $t_1$ and $t_2$ is such that a cellular page message (that is, a radiotelephone call or other transmitted requirement) which is repeated, conventionally, after a 5 second pause will not be missed because the PCC receiver 401 was scanning an alternative system during both cellular page message transmission times. The time $t_1$ must be greater than the sum of the pause between the two pages and the typical time to transmit two pages. The time $t_2$ must be less than the time between the two pages. If the pause time is 5 seconds and the typical time to transmit a page is 185.2 milliseconds, $t_1$ must be greater than the 5.3704 seconds and $t_2$ must be less than 5 seconds. After monitoring the cellular system signaling channel for a time $t_1$, the PCC receiver 401 may be instructed to tune to the signaling channel or to the signaling channels, sequentially, of the microcell system, as shown at 437. If an adequate microcell signaling channel is not found during the scan of predetermined signaling channel frequencies, the PCC receiver 401 retunes to the cellular system signaling channel, as shown at 439.

A scan to the signaling channels, 441, of the cordless base station 115 which discovers a signaling data stream meeting appropriate quality requirements results in the PCC receiver 401 continuing to monitor the cordless signaling channel. The PCC receiver 401 remains on the cordless signaling channel without rescanning to another system until the PCC 101 cannot receive the cordless basels transmitted signal for a continuous 5 second period of time.

The effect of this priority process is to give priority to the cordless base station 115 at the PCC 101. Once the signaling channel of the cordless base station 115 is discovered, the PCC 101 remains tuned to this channel. Thus, when the PCC 101 is initially tuned to the cellular system it will automatically switch to the cordless base station when it is possible to access the cordless base station. Once the PCC receiver 401 has found the cordless base signaling channel, it remains tuned to that channel. When the FCC transceiver is first turned on, its first scan of signaling channels is the reestablished signaling channel or channels of the cordless base station 115. Of course, the user may override the automatic priority scanning hierarchy by entering an override code into the PCC 101. In this manner, the user may force the scanning of the cellular system signaling channels only, the cordless base signaling channels only, the microcellular system signaling channels only, or combinations of the systems. The user may also perform a call origination with a one time override to the system of his choice.

Once the signaling channel of a system is being monitored, a visual indication is given to the PCC transceiver user. In the preferred embodiment, this indicator is a set of light emitting diodes (LEDs) 415, 417, one of which uniquely illuminates to indicate to which system the PCC transceiver is tuned. Other indicators may alternately be used to convey the same information. For example, a system identifier may appear in the number display of the PCC 101, or a flashing symbol (having different rates of flashing) may be used. Nevertheless, this indication enables the user to determine which system he is in and decide whether he wishes to complete a radiotelephone call in the indicated system.

In order for the PCC 101 to communicate with the cordless base station 115 it must be authorized to use a particular channel. Authorization is required since the licensee of the cellular spectrum is required by the FCC to maintain control of its transmitters. The cordless base station 115 is programmed to update its authorization periodically. To do this the personal base station 115 initiates a phone call to the ACRE 117. The ACRE 117 responds with a connect message 502 (see FIG. 7) which contains a first random number that will be used in the authentication process. The cordless base station 115 responds with an authentication message 504. The authentication message 504 contains a cordless base station ID, a first authentication result calculated using the first random number, and a second random number. The ACRE 117 responds with an authorization and authentication message 506, which contains a second authentication result calculated using the second random number, and information describing which channels the cordless base station 115 can communicate over with the PCC 101. The cordless base station 115 responds with a registration message 507 which contains the PCC's 101 mobile identification number. The registration message 507 is only sent when a PCC 101 is in range of the cordless base station 115. The registration message 507 informs the ACRE 117 to route the calls to the PCC 101 to the cordless base station 115. The ACRE 117 responds by sending a registration acknowledge message 508 to the cordless base station 115, which informs the cordless base station 115 that the registration message 507 was received. The cordless base station 115 then responds with a release message 509, which indicates if the authorization message sequence was successful.

An important feature of a dual use radiotelephone system is to route calls through the "best" system, i.e. cordless, microcellular or cellular. Best can mean least expensive or clearest transmission or can be determined by some other variable. Which system is "best" can change during a phone call or as the PCC 101 moves in and out of the range of various systems. To accomplish this it is necessary for the ACRE 117 to be able to route calls to the cordless base station 115. To do this the ACRE 117 must know the telephone number of the cordless base station 115. One method for accomplishing this is to use caller identification provided by the TELCO 111. Caller identification is designed to provide a telephone number and/or a subscriber name.

Figure 8:
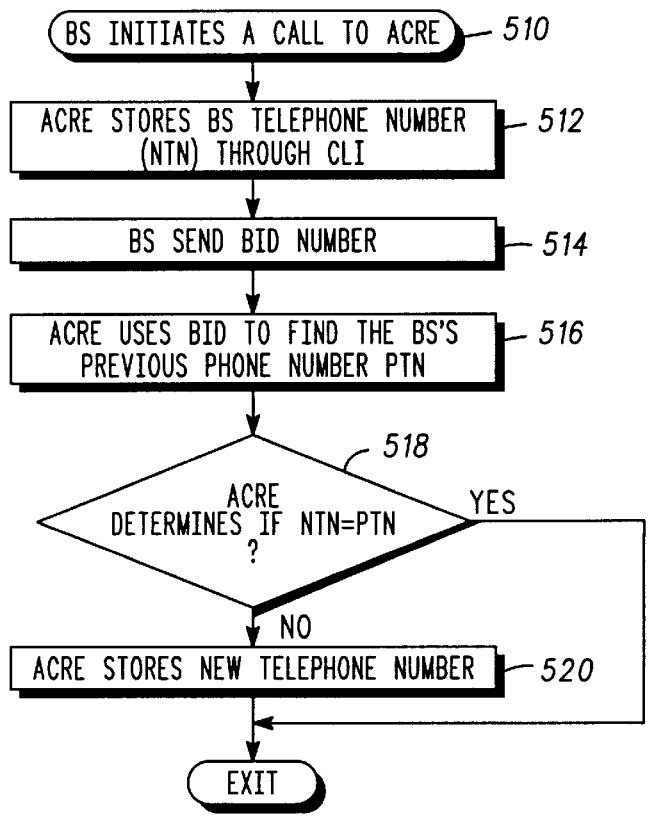
FIG. 8 is a flow chart of one process used to update the telephone number of the cordless base station of FIG. 4 at the ACRE of FIG. 2.

The cordless base station 115 initiates a call to the ACRE 117 as part of the authorization and authentication process as shown in FIG. 8, at block 510. The ACRE 117 receives the telephone number of the cordless base station 115 using caller identification (CLI). The ACRE 117 stores this information in block 512. The cordless base station 115 then sends its base identification number (BID) at block 514. The ACRE 117 uses BID to find the base station's 115 previous phone number, at block 516. At block 518, the ACRE 117 determines if the phone number has changed. If the phone number has changed the ACRE 117 updates the telephone number for the cordless base station 115, at block 520. By this process the ACRE 117 has obtained or updated the cordless base station's 115 phone number which it can use to route subsequent calls.

The updated phone number can also be used by the ACRE 117 to determine if the cordless base station 115 is located in an area where the cellular system provider is licensed to provide service by the FCC. For instance, a cellular system provider may only be licensed to provide service in the Chicago area. If a cordless base station 115 were moved by its owner outside the licensed area, the ACRE 117 would receive the base station's 115 new phone number and deny service to the base station 115. This would prevent the base station 115 from transmitting over frequencies in an unlicensed area. Equally important, the cordless base station would still be calling the ACRE 117 in Chicago which would now be an expensive long distance telephone call. By denying service the owner is alerted to this potentially expensive situation.

Figure 9:
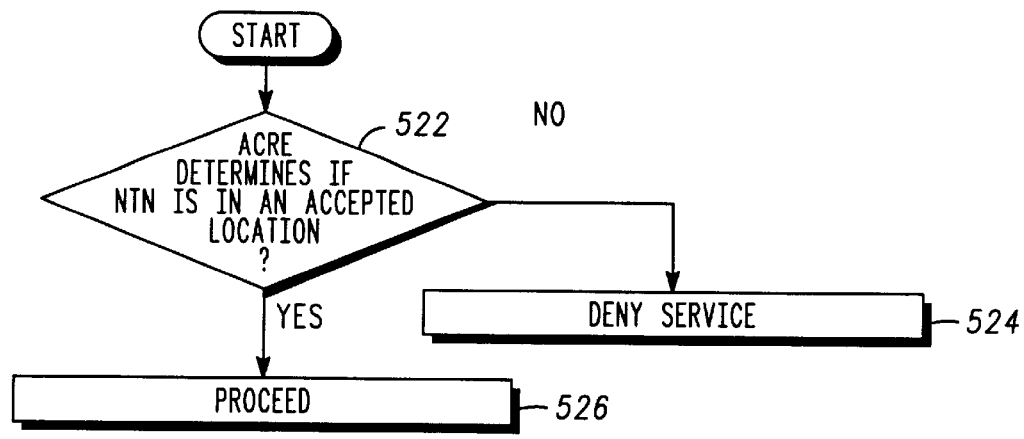
FIG. 9 is a flow chart of the process the ACRE of FIG. 2 uses to determine if the cordless base station of FIG. 4 is in an acceptable location.

This process is shown in FIG. 9. The ACRE 117 after receiving the phone number in FIG. 8 determines if the phone number is an acceptable range, at block 522. If the phone number is not in an acceptable range the ACRE 117 denies service, at block 524. If the phone number is in an acceptable range the phone call proceeds, at block 526. Since caller identification can provide either a telephone number and/or subscriber name, the process of FIG. 9 could use the subscriber name instead of the telephone number.

If caller identification has not been implemented in the TELCO 111 system then the authorization and authentication message sequence must be altered to request cordless base station's 115 phone number periodically. Since, the cordless base station 115 is likely to stay at one phone number for extended periods of time the ACRE 117 would not require the cordless base station 115 to send its phone number every time it called the ACRE 117. However, upon initial installation of the cordless base station 115 the ACRE 117 would need the base station phone number. Also, when the base station moved to a new phone number and the user remembered to update the base station phone number the base station 115 must be able to report its new phone number if the ACRE 117 does not request the base station phone number.

Figure 10:
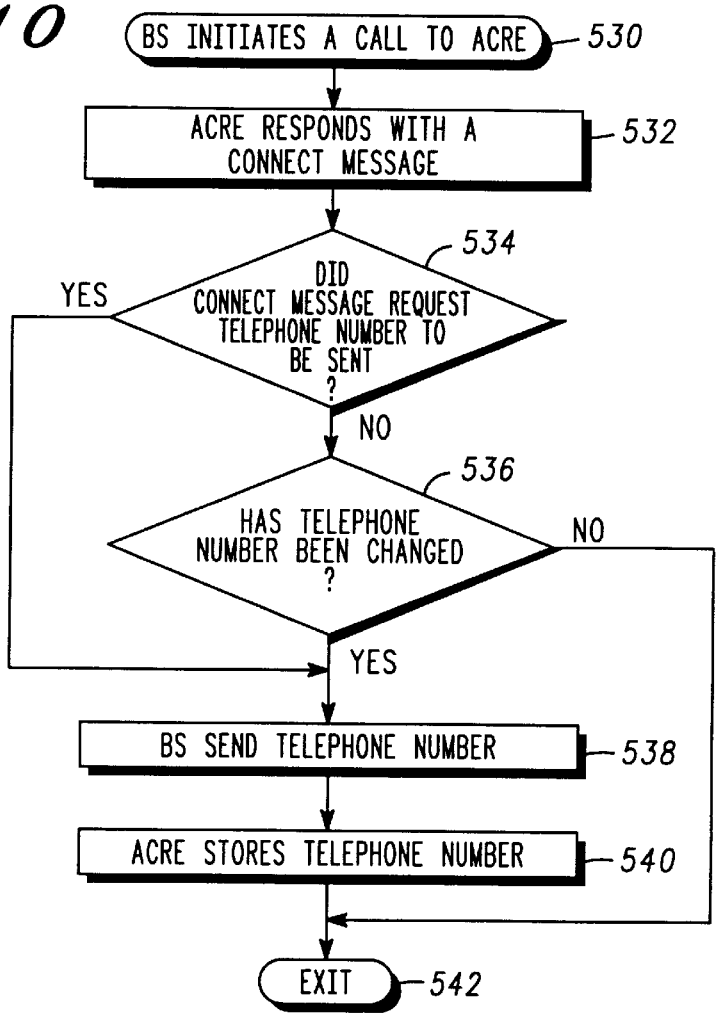
FIG. 10 is a flow chart of another process used to update the telephone number of the cordless base station of FIG. 4 at the ACRE of FIG. 2.

This process is described in FIG. 10, and begins with the cordless base station 115 initiating a call to the ACRE 117, at block 530. The ACRE 117 responds with the connect message, at block 532. The cordless base station 115 then determines if the connect message requested the base station phone number be sent, at block 534. If yes, then the processing continues at block 538; if no, the base station determines if its phone number has changed, at block 536. If the phone number has not changed, the processes is exited, at block 542. If the phone number did change in block 536, then the cordless base station 115 sends its phone number, at block 538. The ACRE 117 stores the phone number for subsequent call routing, at block 540.

A further embodiment of the invention provides the cordless base station 115 with the capability to receive caller identification information via the TELCO interface 321. The cordless base station 115 can then store a plurality of caller identification messages in its memory 315. The caller identification messages contain a telephone number of the person trying to place a call to the cordless base station 115, and may include the name of the person or phone which originated the telephone call and a time and date stamp.

Figure 11:
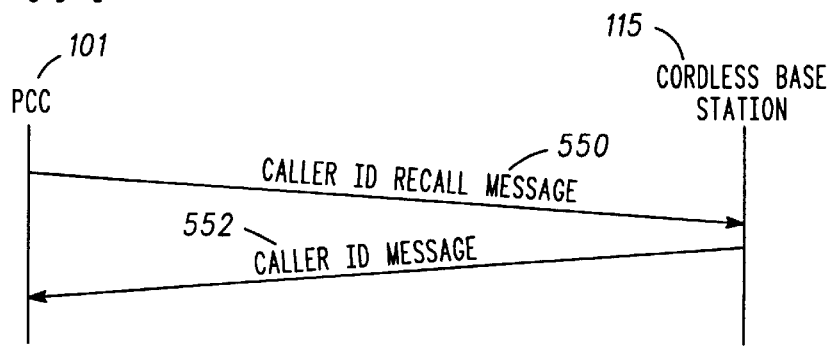
FIG. 11 is a diagram of the caller identification message sequence.

The PCC 101 can be equipped to receive caller identification messages transmitted from the cordless base station 115 through its transmitter 301 to the PCC's receiver 401. Since, the PCC 101 will not always be in range of the cordless base station, 115 it should only transmit the caller identification information when requested to do so by a request signal. The request signal can be initiated by a number of events. For instance, the user could initiate a request signal by a keypad sequence or voice command to the PCC 101 which would then send a caller identification recall message 550 to the cordless base station 115, as shown in FIG. 11. The cordless base station 115 would respond with a caller identification message 552 containing the caller identification messages stored in the cordless base station 115. Alternatively, the request signal could be initiated whenever the PCC 101 first comes within range of the cordless base station 115. Once the PCC 101 recognizes it is within range of the cordless base station 115, the PCC 101 could initiate a request signal and send a caller identification recall message 550 to the cordless base station 115. Finally, whenever the PCC 101 is in range of the cordless base station 115 and a telephone call is placed to the PCC 101 the ring signal should initiate the request signal.

Turning now to FIG. 12, the preferred format for transmitting information between the cordless base station and the PCC, as well as specific messages are shown. In particular, FIG. 12-1 shows the reverse message format (i.e. from the PCC to the cordless base station) having a sync field 554 and a word field 556. Generally, the sync and word fields are alternately sent as shown in FIG. 12-1. FIG. 12-2 shows the word format for caller identification recall message 550 of FIG. 11. In particular, caller identification recall message 550 includes a scramble count field 558 which is incremented for each word that is transmitted to insure that if the wrong cordless base station decodes a word, the next word will not be decoded. The caller identification recall message also includes a reverse cordless message 560 and a location number 562 indicating the location of the number being recalled. The caller identification recall message also includes a caller identification recall type field 564 which allows recalling by location number, recalling the most recent location, recalling the oldest location, recalling the next location and recalling the previous location. A reserve field 566 is also included. Finally, the caller identification recall message includes a message qualifier field 568 and a parity field which is encoding the Bose-Chaudhurai-Hocquenghem (BCH) method.

Turning now to FIG. 12-3, the general forward channel format is shown. In particular, the forward channel format includes a sync qualifier field 572, a sync field 574, and a word field 576 which is periodically repeated. FIG. 12-4 shows the generic caller identification word format. In particular, the generic caller identification word format includes a scramble count field 578, a forward cordless message type field 580, and a word number$_3$ field 582. The message also includes a FLIP field 584 for indicating the FLIP state of the words which are being acknowledged. The message also includes a field 586 indicating that additional words are coming, followed by caller identification information field 588. A word number$_{2-0}$ field 590 is then sent in the message. The word number$_3$ and word number$_{2-0}$ are used collectively to indicate which word of the caller identification message is being transmitted. A mobile station ID number field 592 indicates which mobile station (PCC) is allowed to communicate on the reverse cordless channel. Finally, a parity field 594 is sent.

The caller identification information 588 of the generic caller identification word format may contain various types of data. Some specific examples of data are shown in FIGS. 12-5 through 12-9. The caller identification message is comprised of one or more words utilizing the generic caller identification word format and may contain the specific examples of data shown in FIGS. 12-5 through 12-9 for the caller identification information 588.

In particular, the caller identification location number word shown in FIG. 12-5 includes a location number field 566 followed by a reserve field 598 and a recall field 600 for the caller identification information field 588. The recall field is set to 1 to differentiate this word from the caller identification header word shown in FIG. 12-6.

FIG. 12-6 shows the caller identification header word. The caller identification information field 588 for this word contains a month field 602, a day field 604, hour field 606, minute field 608, line number field 610, name type field 612, number preferred field 614, and recall field 616. Fields 602, 604, 606, and 608 provide a time stamp of when the caller identification message was received by the cordless base station. The line number field 610 indicates on which telephone line the caller identification message was received. Name type field 612 indicates whether the ASCII caller identification name format of FIG. 12-8 or the compressed ASCII character caller identification name format of FIG. 12-9 will be utilized. The number preferred field 614 indicates the order of the name and number caller identification words. For example, a value of zero indicates that name words are sent first and a value of one indicates that number words are sent first.

Figure 7:
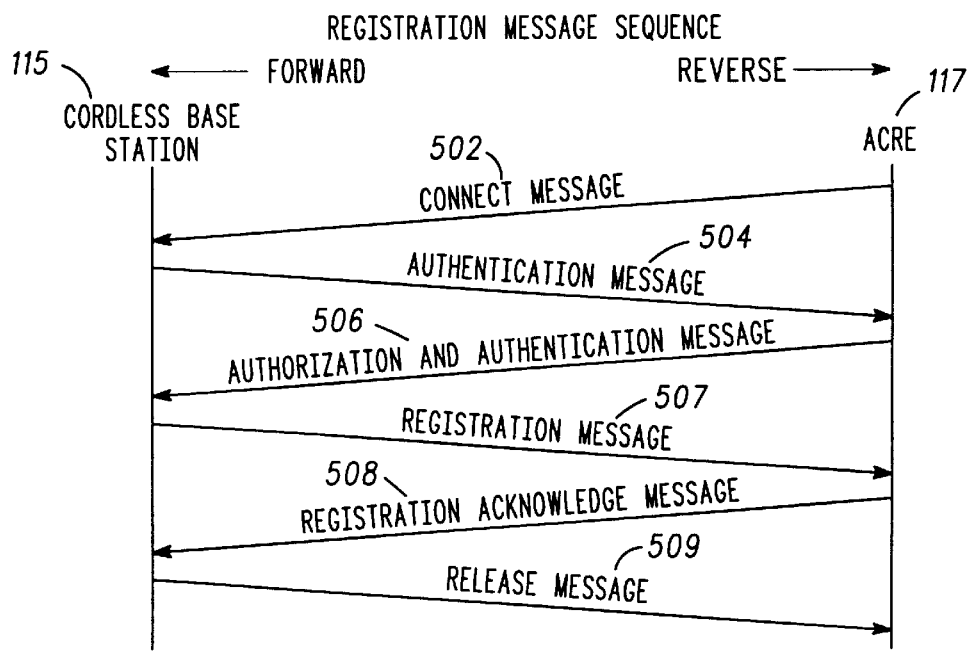
FIG. 7 is a timing diagram for the registration message sequence.

FIG. 12-7 shows the caller identification number word. The caller identification information field 588 for this word includes multiple digit fields 620. A predefined value could be entered into one of the digit fields to indicate the last word of a number and the end of the number.

FIG. 12-8 shows a first caller identification name word having an ASCII format which is preferrably 8 bits long. A predefined value could be entered into one of the character fields to indicate the last word of the name and the end of the name.

FIG. 12-9 shows a second caller identification name word having a compressed ASCII format which is preferrably 6 bits long. This compression is done to minimize transmission time. The compression only allows a limited number of characters to be utilized. A predefined value could be entered into one of the character fields to indicate the last word of the name and the end of the name.

A radiotelephone and system for allowing the radiotelephone to operate in the cellular, microcellular or cordless communication systems has been described. In order to route calls to a cordless base station 115, it is necessary for the ACRE 117 to know the base station's 115 telephone number. One method for obtaining the cordless base station's 115 telephone number is to use caller identification provided by the TELCO 111 when the base station 115 calls in for authorization to the ACRE 117. Another method requires the ACRE 117 periodically request the base station's 115 telephone number. This method also allows the base station 115 to send its telephone number when ever the base station's 115 telephone number has changed. Both methods insure the ACRE 117 has the telephone number of the base station 115 for proper call routing. Additionally, the cordless base station 115 can be provided with caller identification recognition capabilities. This allows the cordless base station 115 to store caller identification messages and transmit them to the PCC 101.

To those skilled in the art it is obvious that many modifications can be made to the invention without departing from the spirit of the invention. For instance, the ACRE 117 can be performed by several pieces of equipment, which could be located separately from each other. Or the authorization function and equipment could be separate from the call routing equipment and function. Also it would be obvious to those skilled in the art to substitute any number of devices for the PCC 101 in receiving the caller identification information from the cordless base station. Such devices would include electronic appointment and address books or a modem in a portable computer. Any such modification is considered to be part of the inventor's exclusive rights is this invention. For a full understanding of the scope of the invention reference should be made to the appended claims.

We claim:

1. Call routing equipment for use in a communication system including a base station having an assigned landline telephone number and a base identification number (BID), communicatively coupled with the call routing equipment via a public switched telephone network (TELCO), and capable of sending the assigned landline telephone number and BID to the call routing equipment, the call routing equipment capable of storing landline telephone numbers and BIDs in the call routing equipment, the call routing equipment comprising:

means for receiving the assigned landline telephone number and the BID from the base station via the TELCO providing caller identification;

means for finding a stored landline telephone number for the base station according to the received BID;

means for determining if the received assigned landline telephone number is equal to the stored landline telephone number for the base station; and means for updating the stored landline telephone number for the base station with the received assigned landline telephone number when the received assigned landline telephone number is not equal to the stored landline telephone number of the base station.

2. A method of updating a base station's stored landline telephone number that is stored in a call routing equipment in preparation for future call routing, the base station having an assigned landline telephone number and a base identifi cation number (BID) and being communicatively coupled with the call routing equipment via a public switched telephone network (TELCO), the TELCO providing caller identification, the method comprising the steps of:

initiating, by the base station, a call to the call routing equipment:

receiving, by the call routing equipment, the BID sent from the base station;

receiving, by the call routing equipment, the assigned landline telephone number from the TELCO via caller identification;

determining, by the call routing equipment, if the assigned landline telephone number is equal to the stored base station's landline telephone number; and updating, by the call routing equipment, the stored base station's landline telephone number with the assigned landline telephone number when the assigned landline telephone number is not equal to the stored base station's landline telephone number.

* * * * *